(12) United States Patent
Sheng et al.

(10) Patent No.: US 11,818,312 B2
(45) Date of Patent: Nov. 14, 2023

(54) DUPLEX SCAN INDICATIVE SCANNER, SCANNING APPARATUS AND SCANNING METHOD

(71) Applicant: AVISION INC., Hsinchu (TW)

(72) Inventors: Shao-Lan Sheng, Hsinchu (TW); Shih Chao Sheng, Hsinchu (TW)

(73) Assignee: AVISION INC., Hsinchu (TW)

( * ) Notice: Subject to any disclaimer, the term of this patent is extended or adjusted under 35 U.S.C. 154(b) by 353 days.

(21) Appl. No.: 17/398,569

(22) Filed: Aug. 10, 2021

(65) Prior Publication Data

US 2022/0078300 A1    Mar. 10, 2022

(30) Foreign Application Priority Data

Sep. 7, 2020  (TW) ................................ 109130559

(51) Int. Cl.
 *H04N 1/00* (2006.01)

(52) U.S. Cl.
 CPC ..... *H04N 1/00824* (2013.01); *H04N 1/00477* (2013.01); *H04N 1/00572* (2013.01); *H04N 1/00822* (2013.01)

(58) Field of Classification Search
 CPC ........... H04N 1/00572; H04N 1/00824; H04N 1/2032; H04N 1/00477; H04N 1/00822; H04N 1/2038
 USPC ......................................... 358/400, 474, 498
 See application file for complete search history.

(56) References Cited

U.S. PATENT DOCUMENTS

| | | | |
|---|---|---|---|
| 4,839,740 A | 6/1989 | Yoshida | |
| 6,075,622 A | 6/2000 | Hadgis et al. | |
| 6,415,117 B1 | 7/2002 | Bates et al. | |
| 2003/0038988 A1 | 2/2003 | Anderson et al. | |
| 2005/0134871 A1 | 6/2005 | Nakagiri | |
| 2007/0013972 A1 | 1/2007 | Sheng | |
| 2007/0212146 A1* | 9/2007 | Lyons ................... | B41J 15/042 400/82 |
| 2011/0058871 A1* | 3/2011 | Motoyama .......... | G03G 15/232 399/364 |

(Continued)

FOREIGN PATENT DOCUMENTS

| | | |
|---|---|---|
| CN | 100401735 C | 7/2008 |
| TW | 1281346 B | 5/2007 |

*Primary Examiner* — Gabriel I Garcia
(74) *Attorney, Agent, or Firm* — Muncy, Geissler, Olds & Lowe, P.C.

(57) ABSTRACT

A duplex scan indicative scanner includes a sheet passage, a transporting mechanism, one single scanning module, a duplex indicator and a connection interface. The transporting mechanism transports a document past the sheet passage. The scanning module scans a first side of the document passing through the sheet passage. The connection interface is electrically connected to an electronic device, the duplex indicator, the transporting mechanism and the scanning module. After the electronic device has controlled, through the connection interface, the scanning module to scan the first side, the electronic device controls, through the connection interface, the duplex indicator to output a duplex indication message to guide a user to place the document or a second document, so that a second side of the document or the second document is scanned by the scanning module. A duplex scan indicative scanning apparatus and a duplex scan indicative scanning method are also provided.

16 Claims, 9 Drawing Sheets

(56) References Cited

U.S. PATENT DOCUMENTS

2016/0366287 A1* 12/2016 Murata .............. H04N 1/00411
2017/0374215 A1* 12/2017 Sheng ................. H04N 1/2032
2019/0260887 A1*  8/2019 Yoda ................. H04N 1/00061

* cited by examiner

DUPLEX SCAN INDICATIVE SCANNER, SCANNING APPARATUS AND SCANNING METHOD

CROSS-REFERENCE TO RELATED APPLICATIONS

This application claims priority of No. 109130559 filed in Taiwan R.O.C. on Sep. 7, 2020 under 35 USC 119, the entire content of which is hereby incorporated by reference.

BACKGROUND OF THE INVENTION

Field of the Invention

This disclosure relates to a scanner, a scanning apparatus and a scanning method, and more particularly to a duplex scan indicative scanner, a duplex scan indicative scanning apparatus and a duplex scan indicative scanning method.

Description of the Related Art

In a typical duplex scanner, if only one single scanning module is adopted, then a special sheet passage (turn-over passage) and a special transporting mechanism need to be used. First, the scanning module scans a first side of the document, and then the document is turned over through the turn-over passage and the transporting mechanism. Next, a second side of the document is scanned. Finally, the document is transported out. In the duplex scanner, because the complicated sheet passage and transporting mechanism need to be used, the cost is high.

In another duplex scanner using two scanning modules in conjunction with the simpler transporting mechanism and sheet passage, the two scanning modules are directly used to scan the first side and the second side of the document. In this duplex scanner, because two scanning modules are needed, the cost is also high.

Thus, how to provide a simple, convenient and cheap duplex scanner is a problem to be solved.

BRIEF SUMMARY OF THE INVENTION

It is therefore an object of this disclosure to provide a duplex scan indicative scanner, a duplex scanning apparatus and a duplex scanning method using the simple mechanism design and only one single scanning module to effectively decrease the complexity and cost.

To achieve the above-identified object, this disclosure provides a duplex scan indicative scanner including a sheet passage, a transporting mechanism, one single scanning module, a duplex indicator and a connection interface. The transporting mechanism transports a document past the sheet passage. The scanning module scans a first side of the document passing through the sheet passage. The connection interface is electrically connected to an electronic device, the duplex indicator, the transporting mechanism and the scanning module. After the electronic device has controlled, through the connection interface, the scanning module to scan the first side of the document, the electronic device controls, through the connection interface, the duplex indicator to output a duplex indication message to a user to guide the user to place the document or a second document, so that a second side of the document or the second document is scanned by the scanning module.

This disclosure further provides a duplex scan indicative scanning apparatus including a scanner and an electronic device. The scanner includes: a sheet passage; a transporting mechanism transporting a document past the sheet passage; one single scanning module scanning a first side of the document passing through the sheet passage; and a connection interface electrically connected to the scanning module and the transporting mechanism. The electronic device electrically connected to the scanner includes: a control processor electrically connected to the connection interface; and a duplex indicator electrically connected to the control processor. After the control processor has controlled the scanning module to scan the first side of the document through the connection interface, the control processor controls the duplex indicator to output a duplex indication message to a user to guide the user to place the document or a second document, so that a second side of the document or the second document is scanned by the scanning module.

This disclosure further provides a scanning method used in a combination of a duplex scan indicative scanner and an electronic device connected together. The scanning method includes steps of: automatically scanning a first side of a document upon detecting the document located at an input end of a sheet passage; providing a duplex indication message to a user after automatically scanning the first side; automatically scanning a second side of the document or a second document upon detecting the document or the second document located at the input end after providing the duplex indication message; and outputting image data representative of the first side and the second side or the second document.

The duplex scan indicative scanner may further include a blank-page indicator electrically connected to the connection interface. The electronic device judges whether image data representative of the first side or the second side of the second document is blank image data or not, and controls, through the connection interface, the blank-page indicator to output a blank-page indication message to the user to guide the user to place the document or the second document if the image data is the blank image data.

With the above-mentioned embodiments, the low cost duplex scan indicative scanner, scanning apparatus and scanning method can be provided. The duplex indicator is adopted to provide the indication to the user to complete duplex scanning. In addition, the blank-page indicator is adopted to provide the indication of incorrect placement of the document. Furthermore, the start button or output detector is adopted to complete the simplex scanning, so that the user can select the desired operation smoothly.

Further scope of the applicability of this disclosure will become apparent from the detailed description given hereinafter. However, it should be understood that the detailed description and specific examples, while indicating preferred embodiments of this disclosure, are given by way of illustration only, since various changes and modifications within the spirit and scope of this disclosure will become apparent to those skilled in the art from this detailed description.

DETAILED DESCRIPTION OF THE INVENTION

Figure 1:
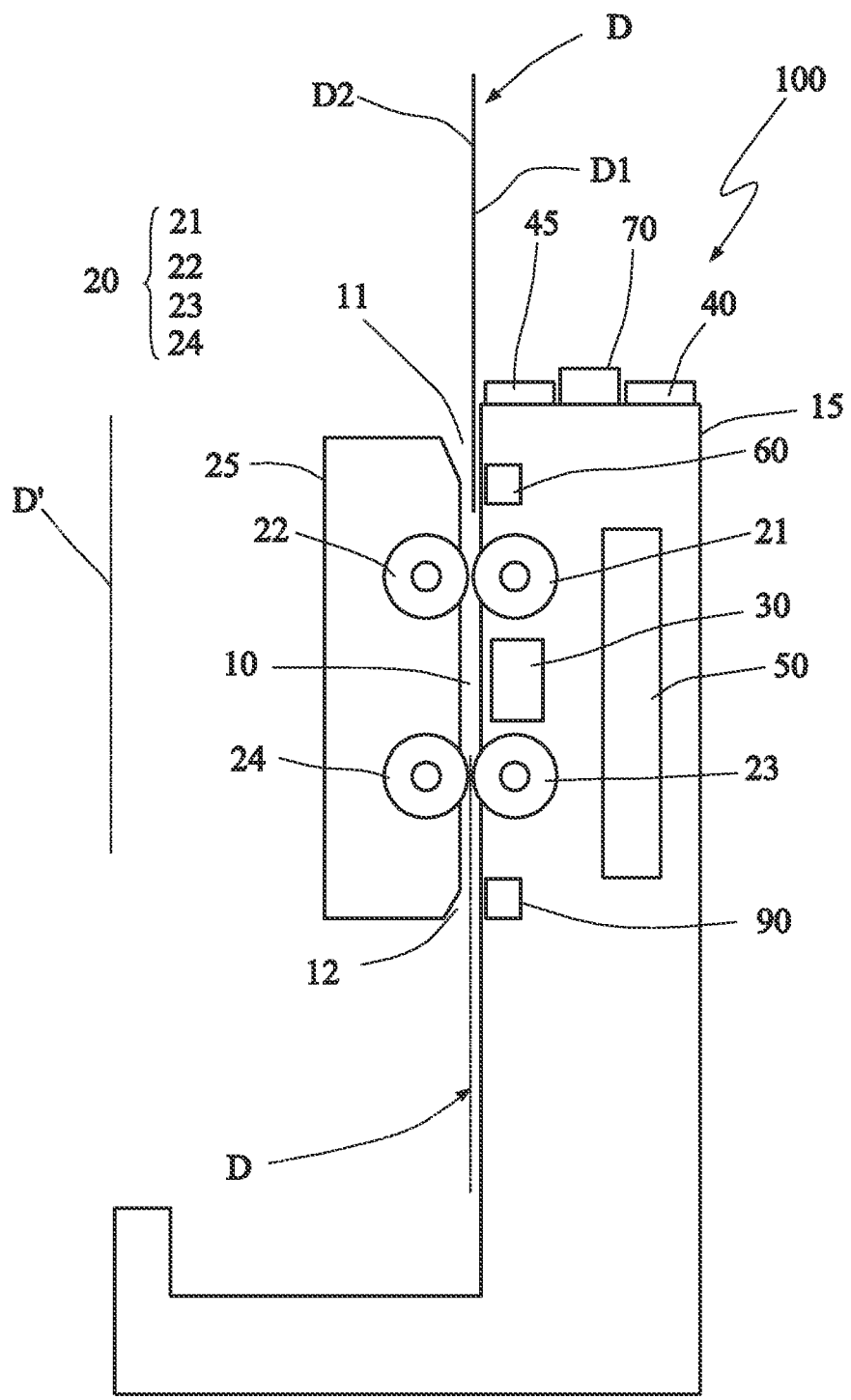
FIG. 1 is a schematic view showing a mechanism of a duplex scan indicative scanner according to a preferred embodiment of this disclosure.
Figure 2:
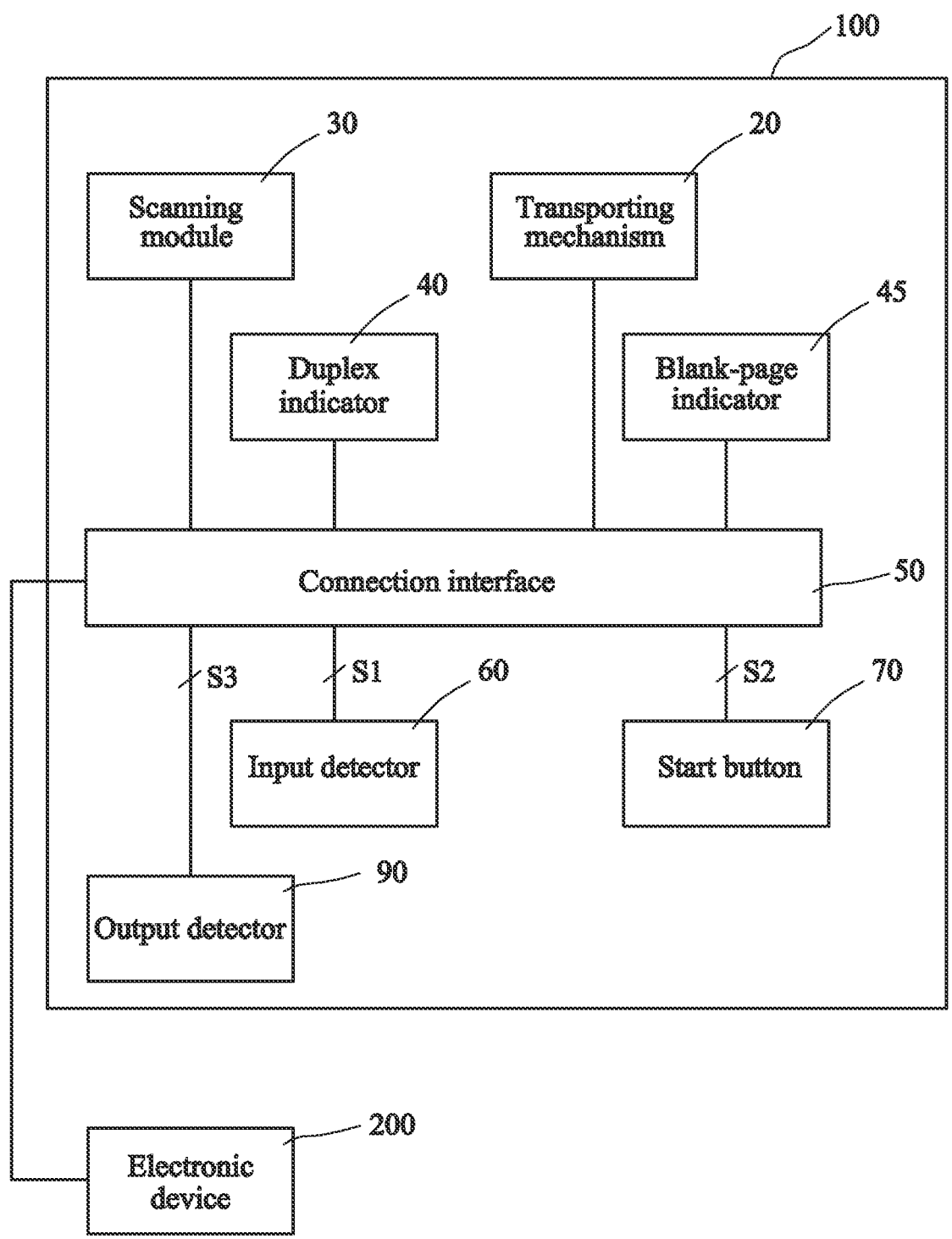
FIG. 2 is a block diagram showing the duplex scan indicative scanner according to the preferred embodiment of this disclosure.

FIGS. 1 and 2 are respectively a schematic view and a block diagram showing a mechanism of a duplex scan indicative scanner according to a preferred embodiment of this disclosure. Referring to FIGS. 1 and 2, a duplex scan indicative scanner 100 of this embodiment includes a sheet passage 10, a transporting mechanism 20, one single scanning module 30, a duplex indicator 40 and a connection interface 50. A housing of the duplex scan indicative scanner 100 may be constituted by a main housing 15 and a sub-housing 25. In this embodiment, a certificate scanner is taken as an example for explanation, but this disclosure is not limited thereto. The scanner of this disclosure can also be applied to a general sheet-fed scanner.

The transporting mechanism 20 transports a document D past the sheet passage 10. In this example, the transporting mechanism 20 includes one pair of rollers 21 and 22 and another pair of rollers 23 and 24. The rollers 21 and 23 are disposed in the main housing 15, and the rollers 22 and 24 are disposed in the sub-housing 25.

The scanning module 30 is a stationary scanning module for scanning a first side D1 of the document D passing through the sheet passage 10. The scanning module 30 is disposed in the main housing 15, but may also be disposed in the sub-housing 25 in another example. The duplex indicator 40 is disposed on the main housing 15, but may also be disposed on the sub-housing 25 in another example. The one single scanning module 30 represents that only one unique scanning module 30 is disposed on the sheet passage 10, and there is no other optical module for scanning the document image. In this embodiment, the sheet passage 10 is a single sheet passage (a linear passage, a U-shaped passage or the like), and there are no other branch passages to turn over the document. In one example, the duplex scan indicative scanner 100 does not have any display or screen to decrease the cost, and the duplex indicator 40 is implemented by hardware components.

The connection interface 50 is electrically connected to an electronic device 200, the duplex indicator 40, the transporting mechanism 20 and the scanning module 30. After the electronic device 200 controls, through the connection interface 50, the scanning module 30 to scan the first side D1 of the document D, the electronic device 200 controls, through the connection interface 50, the duplex indicator 40 to output a duplex indication message to a user to guide the user to place the document D or a second document D', so that a second side D2 of the document D or the second document D' is scanned by the scanning module 30. Upon implementation, the duplex indication message may represent a page turn-over indication, an indication for re-feeding the original document or a second document, or the like. Texts (e.g., Duplex, Duplex Copy or the like) or a small icon may be printed on or beside the duplex indicator 40 to instruct the user that this is an indication for duplex scanning. The duplex indicator 40 may provide visual instructions by flashing lights (using a light emitting diode) or provide auditory indications by voice (using a speaker). The electronic device 200 may be a printer, a multi-function peripheral, a notebook computer, a personal computer or the like. In one example, the electronic device 200 is not equipped with any display or screen to decrease the cost. More particularly, the duplex scan indicative scanner 100 of this disclosure further provides effective duplex scanning guidelines in this case. The electronic device 200 and the duplex scan indicative scanner 100 may also be integrated into one scanning apparatus. In another example, the duplex scan indicative scanner 100 can be considered as an optional product of the electronic device 200. When the duplex scan indicative scanner 100 is electrically connected to the electronic device 200 in a wired or wireless manner, the electronic device 200 enables a duplex-scan indicative scan function in order to control the duplex scan indicative scanner 100 to perform the duplex scanning operation.

Therefore, the effect of this disclosure can be achieved. The duplex scan indicative scanner 100 needs not to be provided with two scanning modules, and also needs not to be provided with the complicated turn-over passage and transporting mechanism. Therefore, the cost can be effectively decreased. Using the duplex indicator 40 to instruct the user to use the low-cost duplex scan indicative scanner 100 can also achieve the duplex scanning function without significantly increasing the difficulty of user's operations. Further details of this disclosure will be explained in the following, and further effects can be achieved.

When the user wants to scan images on two sides of the document D, the electronic device 200 outputs image data representative of the first side D1 and the second side D2 or the second document D' through the connection interface 50 only after the scanning module 30 has scanned the first side D1 and the second side D2 or the second document D'. Therefore, the user would not think that the duplex scanning can be finished by placing the document D only once. The output may be done by a printing unit (not shown) of the electronic device 200. At this time, the output is the copied document. Alternatively, the electronic device 200 may convert the image data into print data, which is directly transmitted to an external printing unit for printing out the print data, or the electronic device 200 may convert the image data into other electronic data for sending by way of facsimile, file transfer, e-mail or the like.

In order to facilitate the user's operation, the duplex scan indicative scanner 100 may further include an input detector 60, which is disposed at an input end 11 of the sheet passage 10 and electrically connected to the connection interface 50. The input detector 60 detects the document D and outputs an automatic scan signal S1 to the electronic device 200 through the connection interface 50, so that the electronic device 200 starts the transporting mechanism 20 and the scanning module 30 according to the automatic scan signal S1. When the user does not want to perform the duplex scanning, the duplex scan indicative scanner 100 may further include a start button 70, which is electrically connected to the connection interface 50 and outputs a start signal S2 upon being pressed by the user. After the electronic device 200 controls, through the connection interface 50, the duplex indicator 40 to output the duplex indication message to the user, the electronic device 200 receives the start signal S2 through the connection interface 50 and outputs image data representative of the first side D1. Texts (e.g., Copy, Start or the like) or a small icon may be printed on or beside the start button 70 to instruct the user that this is an indication for enforcing the simplex scanning. Thus, the user can enforce the scanner 100 to perform the simplex scan or copy operation.

In order to prevent the user from misplacing the document D and thus to prevent a blank page from being scanned, the duplex scan indicative scanner 100 may further include a blank-page indicator 45, which is electrically connected to the connection interface 50. Texts (e.g., Blank, Blank Paper or the like) or a small icon may be printed on or beside the blank-page indicator 45 to instruct the user that this is an indication for the scanned blank page. The blank-page indicator 45 may provide visual instructions by flashing lights (using a light emitting diode) or provide auditory indications by voice (using a speaker). Therefore, the electronic device 200 judges whether the image data representative of the first side D1 or the second side D2 of the second document D' is blank image data or not, and controls, through the connection interface 50, the blank-page indicator 45 to output a blank-page indication message to the user to guide the user to place the document D or the second document D' if the image data is the blank image data.

When the electronic device 200 judges that the image data representative of the first side D1 is the blank image data and the image data representative of the second side D2 or the second document D' is not the blank image data, the electronic device 200 outputs the image data representative of the second side D2 or the second document D' (e.g., by immediately outputting without the user's verification or confirmation) without outputting the image data representative of the first side D1. In another example, the electronic device 200 may also output the image data representative of the first side D1 to avoid the trouble caused by the mis-judgment of the electronic device 200.

Alternatively, when the electronic device 200 judges that the image data representative of the first side D1 is not the blank image data and the image data representative of the second side D2 or the second document D' is the blank image data, the electronic device 200 outputs the image data representative of the first side D1 (e.g., by immediately outputting without the user's verification) without outputting the image data representative of the second side D2 or the second document D'. In another example, the electronic device 200 may also output the image data representative of the second side D2 or the second document D' to avoid the trouble caused by the mis-judgment of the electronic device 200.

Alternatively, the user might incorrectly place the proper side of the document D twice. Therefore, when the electronic device 200 judges that the image data representative of the first side D1 is the blank image data and the image data representative of the second side D2 or the second document D' is the blank image data, the electronic device 200 does not output the image data representative of the first side D1 and the image data representative of the second side D2 or the second document D', and controls, through the connection interface 50, the blank-page indicator 45 to output the blank-page indication message to the user.

In another example, the user's manual may also teach the user to operate the electronic device 200 such that the duplex indicator 40 is controlled to output the duplex indication message after a predetermined time (e.g., 2 to 3 seconds) has been delayed only after the electronic device 200 controls the transporting mechanism 20 and the scanning module 30 to scan the first side D1 of the document D. In still another example, after the electronic device 200 controls the transporting mechanism 20 and the scanning module 30 to scan the first side D1 of the document D, the transporting mechanism 20 (e.g., stop rollers 23 and 24) still nips the document D, and the duplex indicator 40 is controlled to output the duplex indication message only after a predetermined time (e.g., 2 to 3 seconds) has been delayed. If the user takes out the document D within a predetermined time, then the simplex scanning/copying is performed. In this case, the duplex scan indicative scanner 100 further includes an output detector 90, which is electrically connected to the connection interface 50 and disposed at an output end 12 of the sheet passage 10, and generates a take-out signal S3 upon detecting the document D leaving the transporting mechanism 20 (the user takes out the document D). The electronic device 200 outputs the image data representative of the first side D1 according to the take-out signal S3 to perform the simplex scanning/copying. This can also decrease the cost. It is worth noting that the above-mentioned blank-page indicator 45, input detector 60, start button 70 and output detector 90 may be selectively provided to provide required functions.

Figure 3:
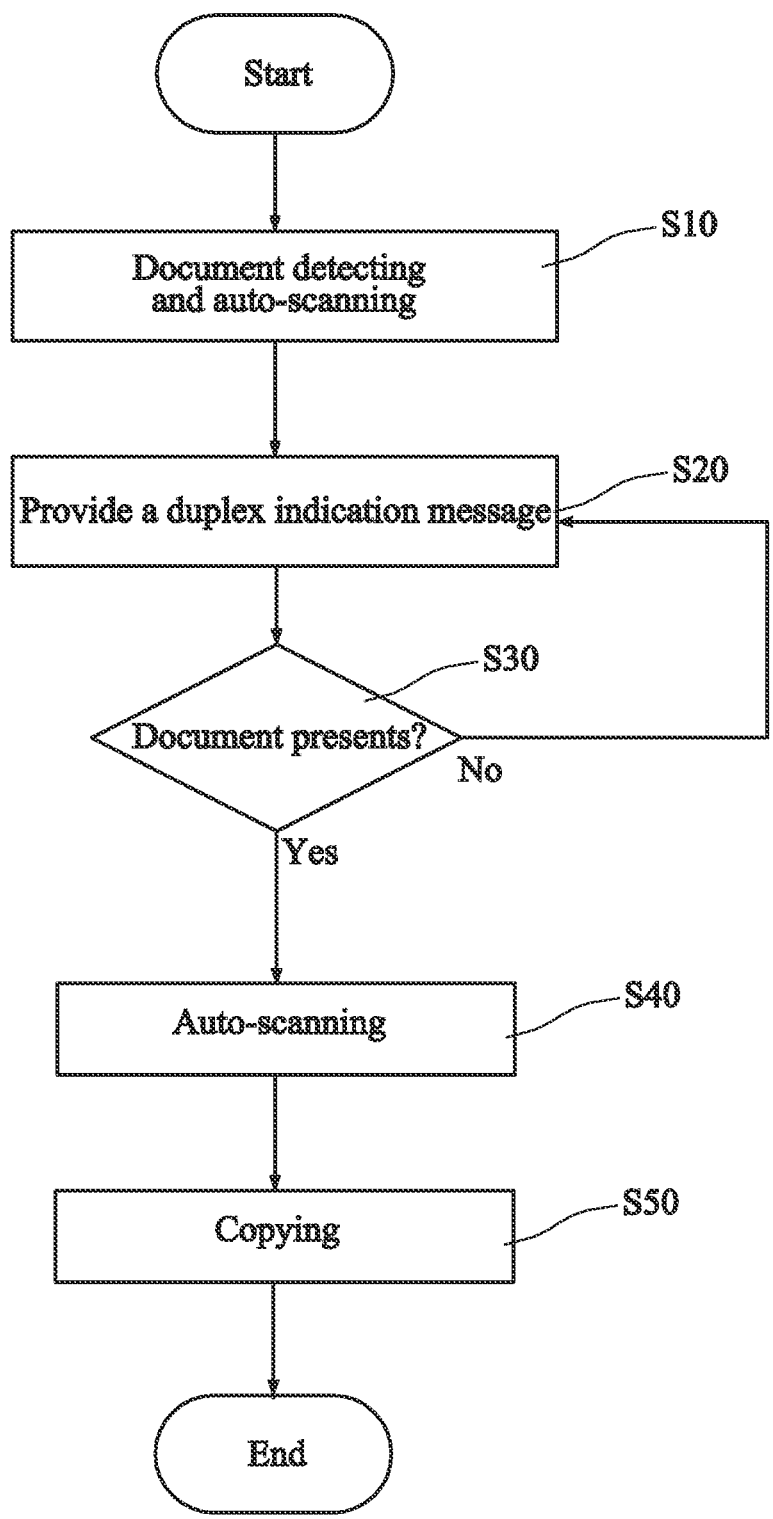
FIGS. 3 to 6 are flow charts showing examples of a scanning method according to the preferred embodiment of this disclosure.

FIGS. 3 to 6 are flow charts showing examples of a scanning method according to the preferred embodiment of this disclosure. Referring to FIGS. 3, 2 and 1, the scanning method of this embodiment is used in the duplex scan indicative scanner 100 and the electronic device 200 connected together, and includes the following steps. First, in a step S10, when one single document is fed, automatically scanning starts. That is, the transporting mechanism 20 and the scanning module 30 are started to scan the first side D1 of the document D automatically when the input detector 60 detects the document D being located at the input end 11 of the sheet passage 10. Thereafter, in a step S20, the duplex indication message is provided to the user after the first side D1 is automatically scanned. Next, in a step S30, it is judged whether the user places the document D or the second document D' at the input end 11. If yes, as shown in a step S40 after the duplex indication message is provided, the second side D2 of the document D or the second document D' is automatically scanned when the input detector 60 detects the document D or the second document D' being located at the input end 11. If not, the process returns to the step S20, and the duplex indication message is continuously provided. Of course, the duplex indication message may also be not removed, and the input detector 60 continuously detects whether the document is present. Next, as shown in a step S50, the image data representative of the first side D1 and the second side D2 or the second document D' is automatically scanned to output. For example, the document is copied. That is, the second side D2 or second document D' is scanned and then automatically printed out.

Figure 4:
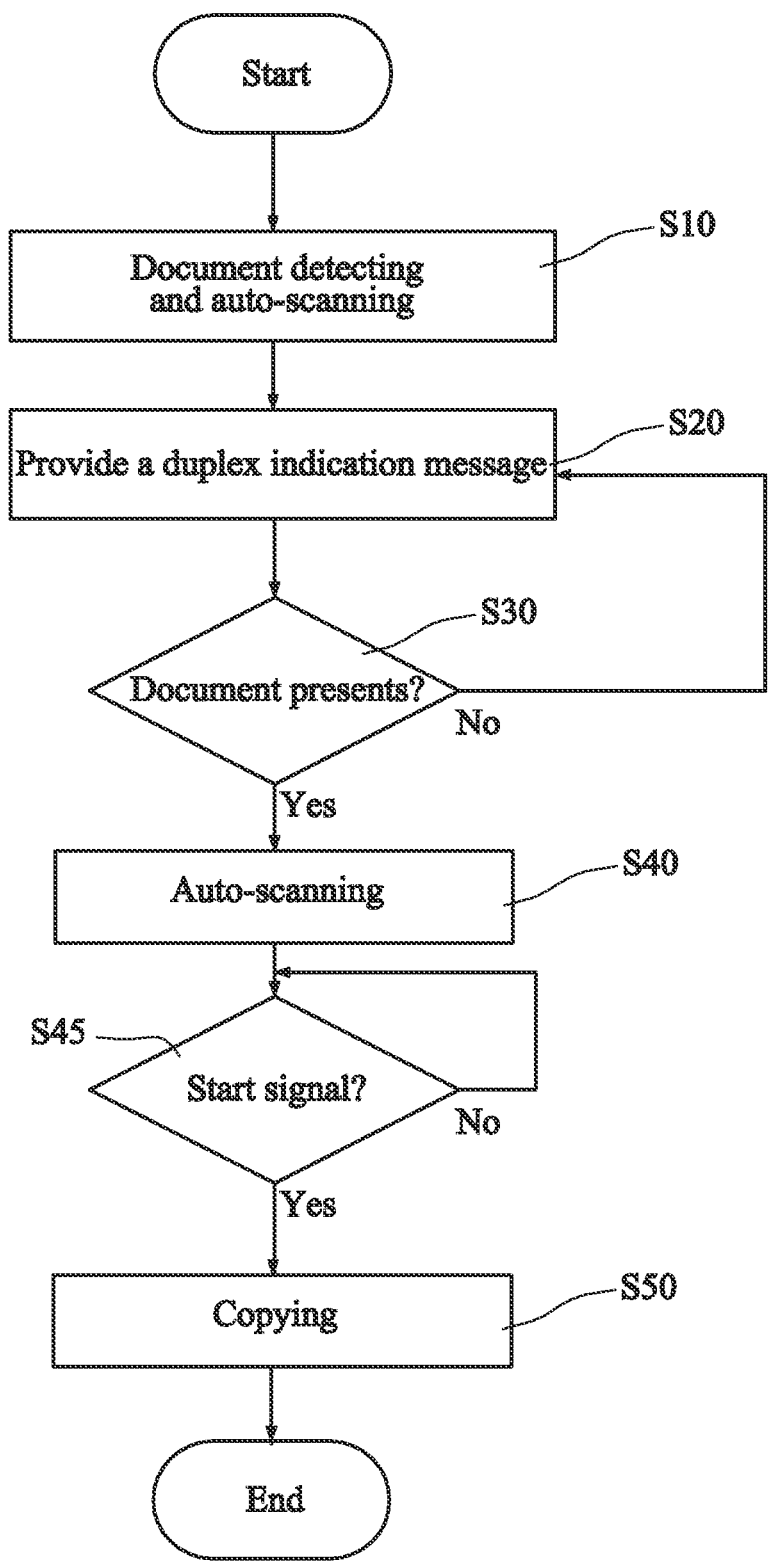

Referring to FIG. 4, this example is similar to FIG. 3 except for the difference that the method further includes a step S45 provided between the steps S40 and S50. The image data representative of the first side D1 and the second side D2 or the second document D' are printed out to produce the copied document, for example, only after the start signal S2 inputted by the user has been received. That is, the copied document is produced only after the user inputs the start signal S2. In one example, if the start signal S2 has not been received within a period of time, copying is automatically performed. In another example, if the start signal S2 has not been received within a period of time, a start indication is outputted to the user to remind the user. For example, the start button 70 can present the flicking lights to prompt the user.

Figure 5:
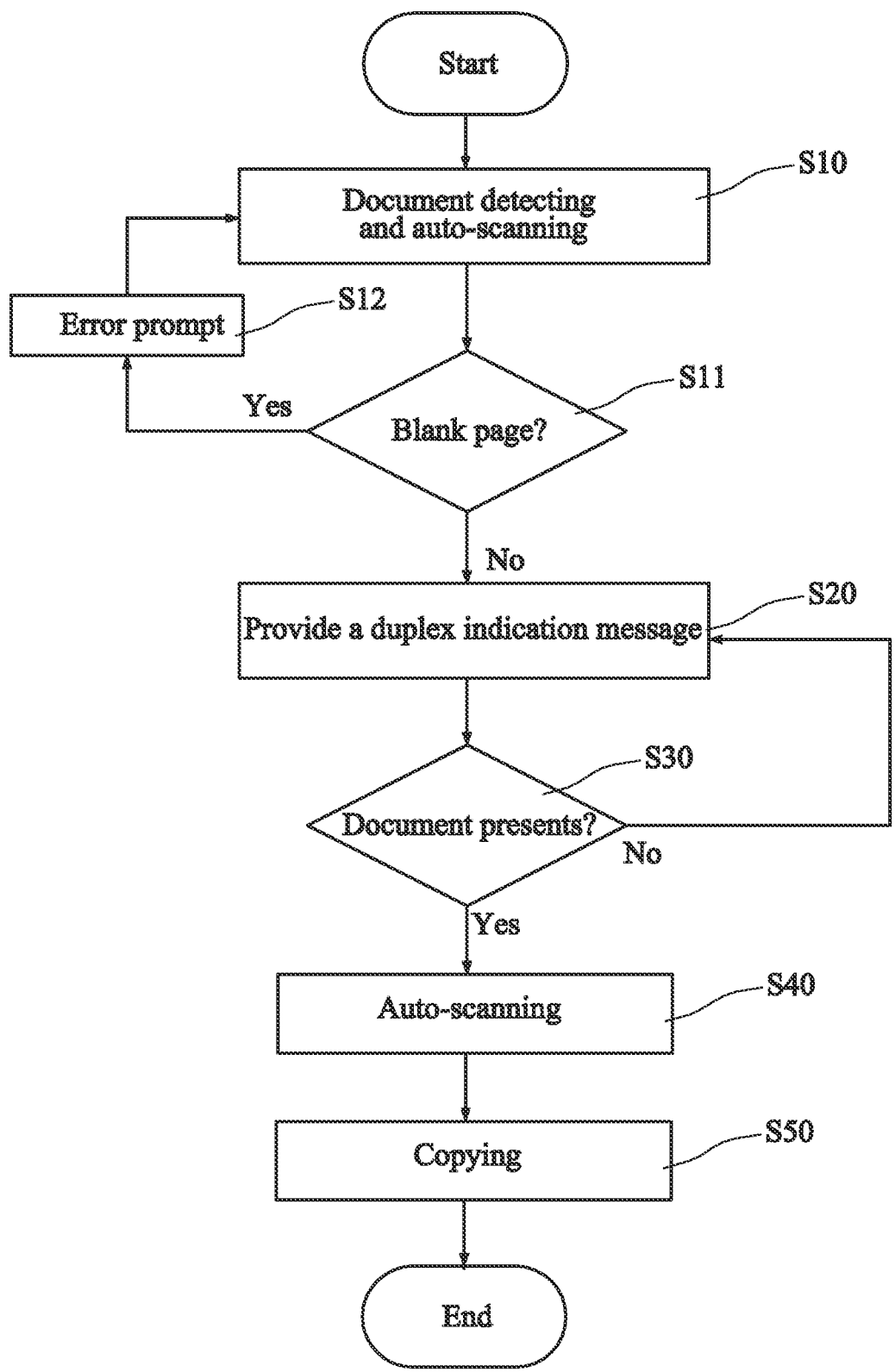

As shown in FIG. 5, this example is similar to FIG. 3 except for the difference that the method further includes steps S11 and S12 provided between the steps S10 and S20.

In the step S11, it is judged that whether the first side D1 is representative of a blank page according to the image data representative of the first side D1. If the first side D1 is not representative of the blank page, then the step S20 is performed to provide the duplex indication message to the user. If the first side D1 is representative of the blank page, then the step S12 is performed to output the error prompt (blank page prompt message) to the user.

Figure 6:
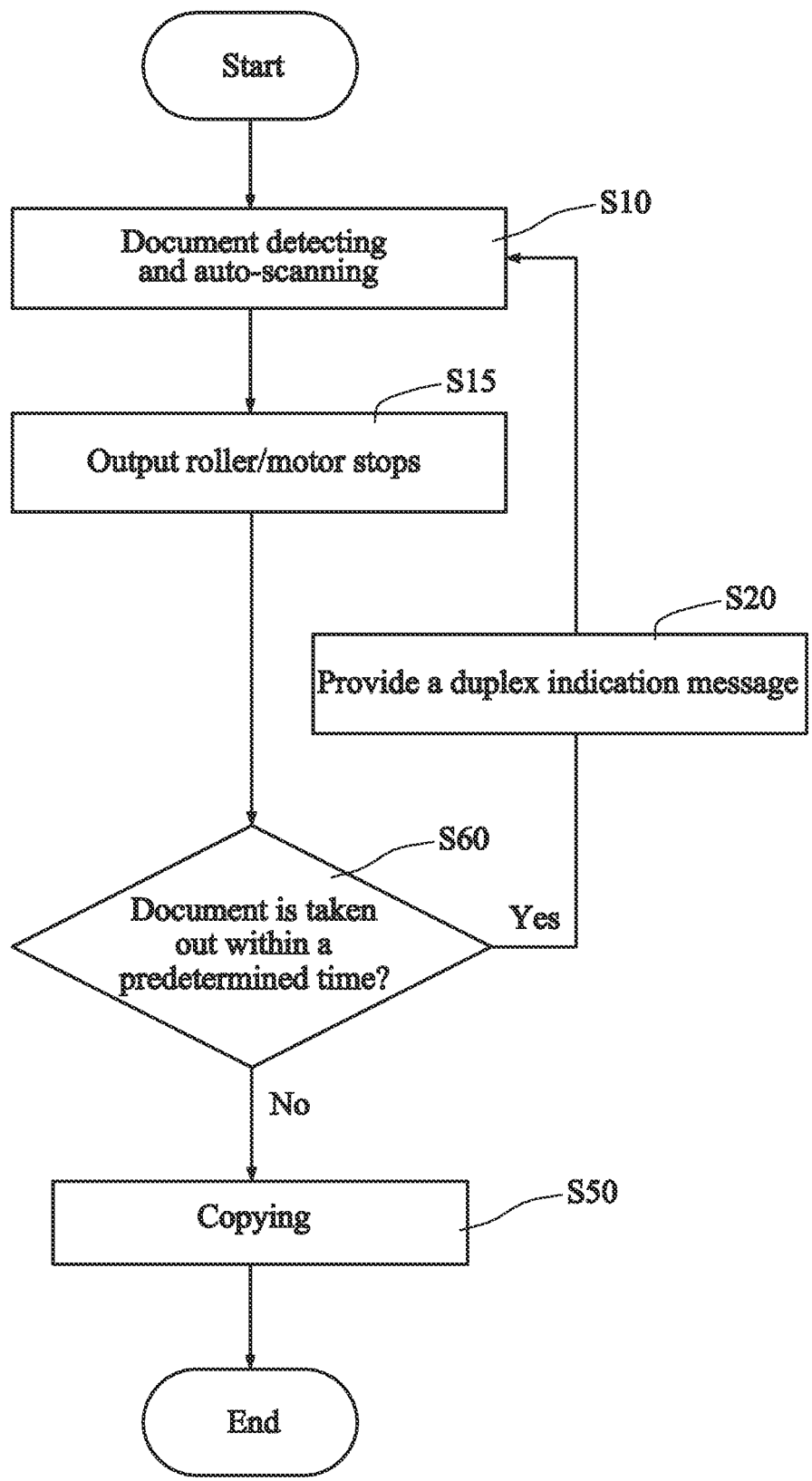

As shown in FIG. 6, this example is similar to FIG. 3 except for the difference that the transporting mechanism 20 still nips the document D (e.g., the output roller or motor stops) after the first side D1 (the step S10) is automatically scanned, as shown in the step S15. Next, in a step S60, it is judged that whether the document D is taken out of the transporting mechanism 20 within a predetermined time (e.g., 2 to 3 seconds). If the document D has not been taken out of the transporting mechanism 20 within the predetermined time, the image data representative of the first side D1 is outputted (e.g., the copied document is produced), as shown in the step S50. If the document D has been taken out of the transporting mechanism 20 within the predetermined time, the duplex indication message is provided to the user. That is, a warning operation is started to provide the page turn-over indication. It is worth noting that in another example of the step S60, it is further judged whether the previously accumulated image data representative of the first side is present. If yes, the step S50 is directly performed. If not, the step S20 is performed.

Figure 7:
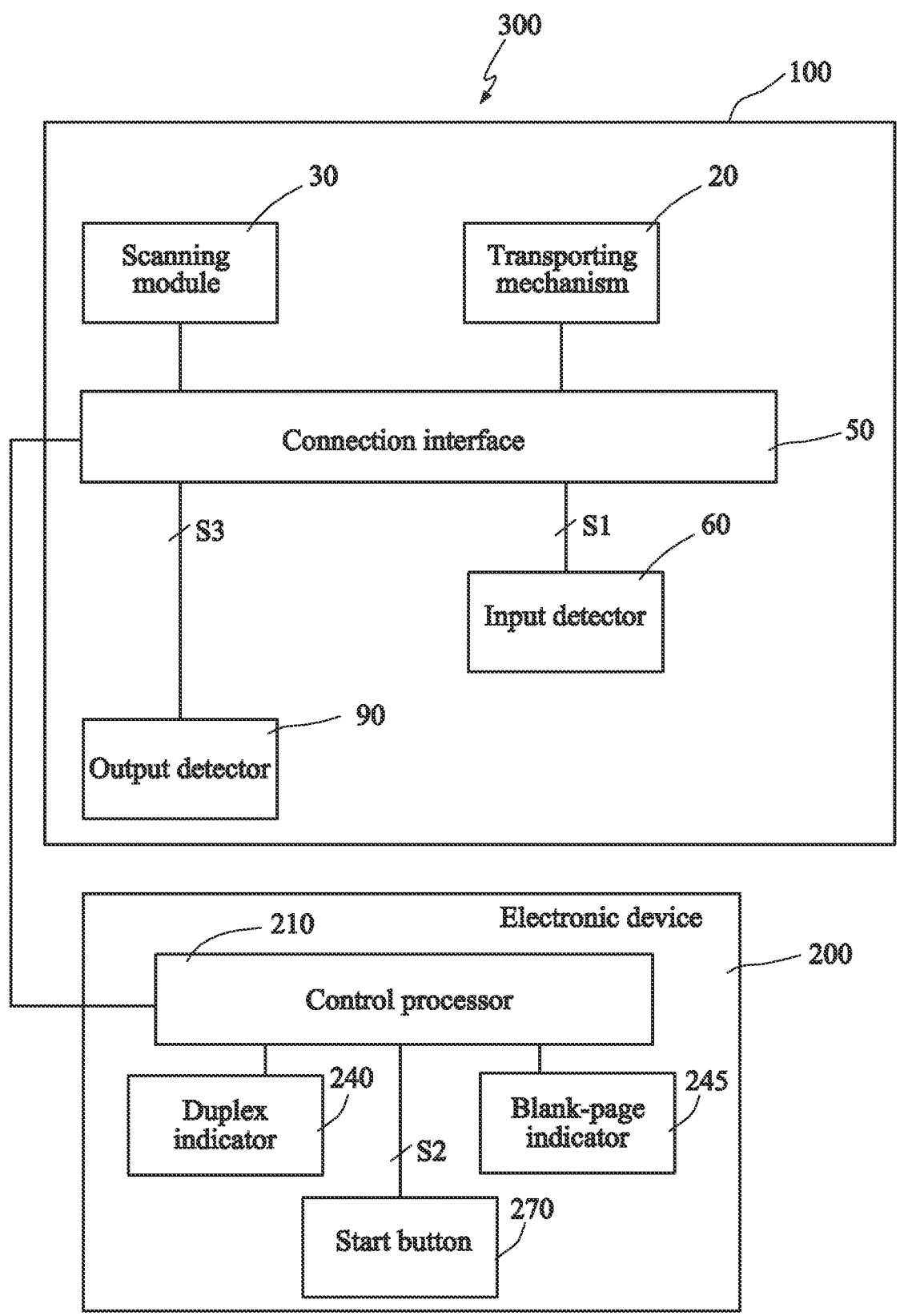
FIG. 7 is a block diagram showing a duplex scan indicative scanning apparatus according to the preferred embodiment of this disclosure.

FIG. 7 is a block diagram showing a duplex scan indicative scanning apparatus according to the preferred embodiment of this disclosure. Referring to FIG. 7 in conjunction with FIG. 1, a duplex scan indicative scanning apparatus 300 of this embodiment is similar to that in FIG. 2, and includes the scanner 100 and the electronic device 200 except for the difference that the duplex indicator and the blank-page indicator are disposed on the electronic device 200.

Referring to FIGS. 7 and 1, the scanner 100 includes the sheet passage 10, the transporting mechanism 20, the scanning module 30 and the connection interface 50. The electronic device 200 is electrically connected to the scanner 100, and includes a control processor 210, a duplex indicator 240 and a blank-page indicator 245. The control processor 210 is electrically connected to the connection interface 50. The duplex indicator 240 is electrically connected to the control processor 210. After the control processor 210 of the electronic device 200 controls, through the connection interface 50, the scanning module 30 to scan the first side D1 of the document D, the control processor 210 of the electronic device 200 controls the duplex indicator 240 to output a duplex indication message to a user to guide the user to place the document D or a second document D', so that a second side D2 of the document D or the second document D' is scanned by the scanning module 30. In this example, the duplex indicator 240 is a non-display type indicator (i.e., it has no display screen or the touch screen, and only has the light or sound indication to decrease the cost). The blank-page indicator 245 is electrically connected to the control processor 210, The control processor 210 judges whether the image data representative of the first side D1 or the second side D2 or the second document D' is blank image data, and controls the blank-page indicator 245 to output a blank-page indication message to the user to guide the user to place the document D or the second document D' if the image data representative of the first side D1 or the second side D2 or the second document D' is the blank image data. In one example, the duplex scan indication mode is started to function as the predetermined mode when it is detected that the control processor 210 has been electrically connected to the connection interface 50.

In FIG. 7, the electronic device 200 may further include a start button 270 which is electrically connected to the control processor 210 and outputs a start signal S2 upon being pressed by the user. After the control processor 210 controls the duplex indicator 240 to output the duplex indication message to the user, the control processor 210 outputs the image data representative of the first side D1 according to the start signal S2. That is, after the duplex indication message is sent to the user and the user does not want to scan the second side, the user presses the start button 270 to enforce the scan result to be outputted finally.

Figure 8:
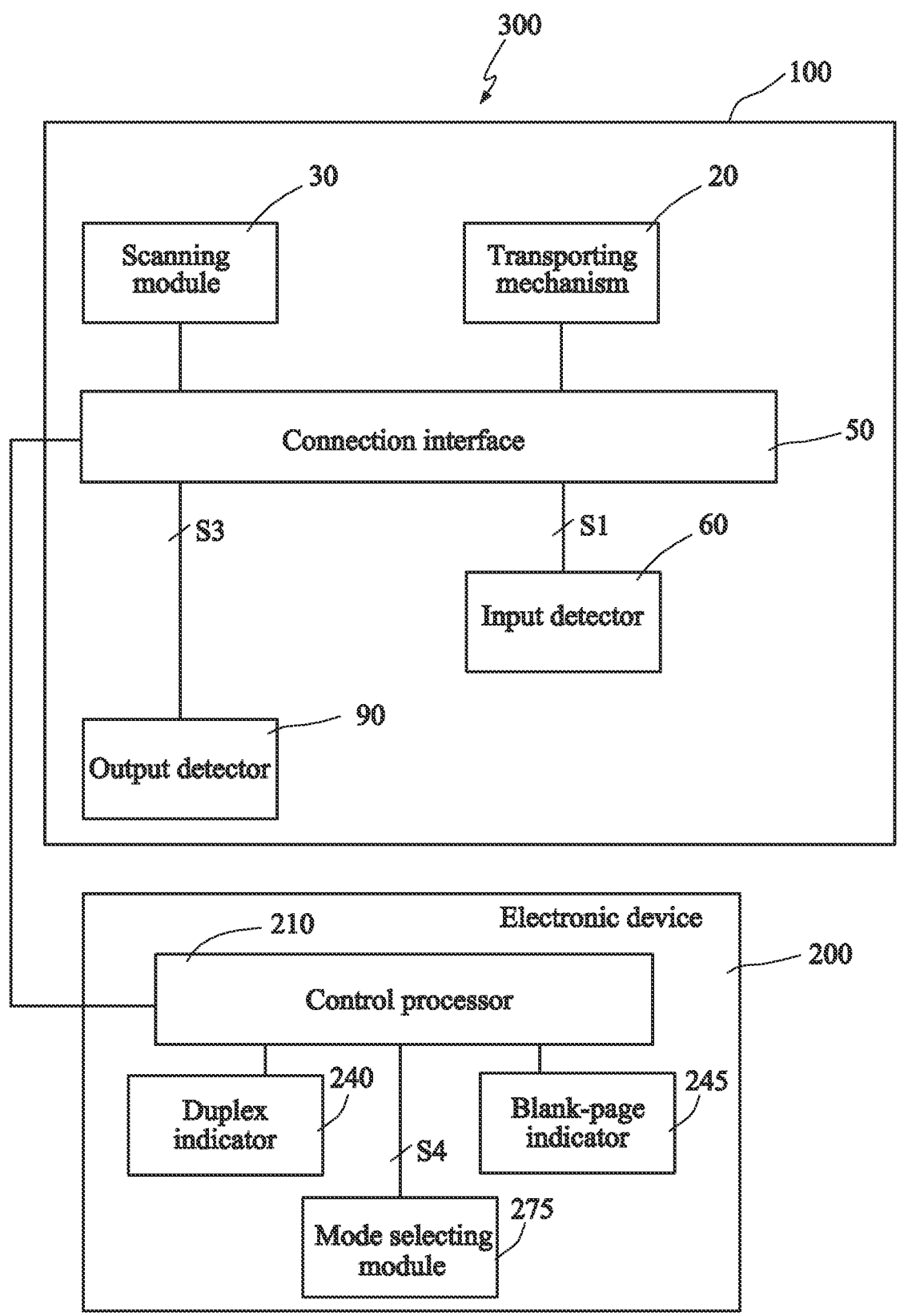
FIG. 8 is a block diagram showing a modified example of the duplex scan indicative scanning apparatus of FIG. 7.

FIG. 8 is a block diagram showing a modified example of the duplex scan indicative scanning apparatus of FIG. 7. Referring to FIG. 8, the electronic device 200 further includes a mode selecting module 275, which is electrically connected to the control processor 210 and outputs a mode signal S4 upon being pressed by the user. The mode selecting module 275 may be implemented by one single switch or multiple switches through which the user can select the simplex scan/copy or duplex scan/copy mode. The control processor 210 controls the scanning module 30 to perform simplex scanning and then to perform outputting according to the mode signal S4 representative of simplex scanning. That is, after simplex scanning, the data is immediately outputted or printed out as the copied document. The control processor 210 controls the scanning module 30 to perform simplex scanning twice and then to perform outputting according to the mode signal S4 representative of duplex scanning. That is, the data is accumulated until two scanning processes have been completed, and the accumulated data is then outputted or printed out. Therefore, the user can perform the pre-selection conveniently, and no start button is required in this case. However, the start button may also be provided.

Figure 9:
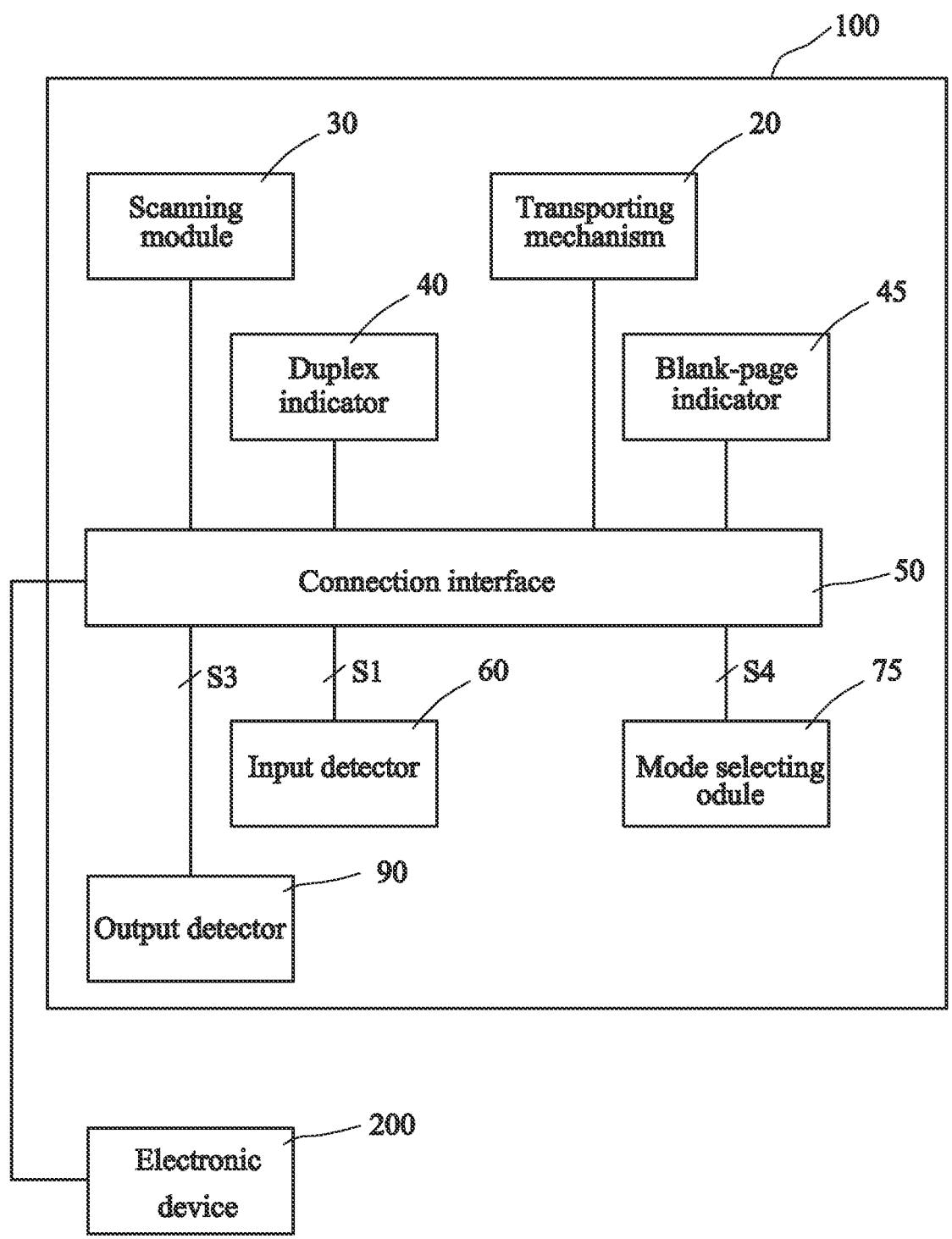
FIG. 9 is a block diagram showing a modified example of the duplex scan indicative scanner of FIG. 2.

FIG. 9 is a block diagram showing a modified example of the duplex scan indicative scanner of FIG. 2. Referring to FIG. 9, the duplex scan indicative scanner 100 further includes a mode selecting module 75, which is electrically connected to the connection interface 50 and outputs the mode signal S4 upon being pressed by the user. The mode selecting module 75 may be implemented by one single switch or multiple switches through which the user can select the simplex scan/copy or duplex scan/copy mode. The electronic device 200 controls the scanning module 30 to perform simplex scanning and then to perform outputting according to the mode signal S4 representative of simplex scanning. That is, after simplex scanning, the data is immediately outputted or printed out as the copied document. The electronic device 200 controls the scanning module 30 to perform simplex scanning twice and then to perform outputting according to the mode signal S4 representative of duplex scanning. That is, the data is accumulated until two scanning processes have been completed, and the accumulated data is then outputted or printed out. Therefore, the user can perform the pre-selection conveniently, and no start button is required in this case. However, the start button may also be provided.

It is worth noting that although the embodiments have been described by taking the duplex scan and duplex indication as examples, this disclosure is not restricted thereto because this disclosure may also be applied to the condition of multi-side scan and multi-side indication.

With the above-mentioned embodiments, the low cost duplex scan indicative scanner, scanning apparatus and scanning method can be provided. The duplex indicator is adopted to provide the indication to the user to complete duplex scanning. In addition, the blank-page indicator is adopted to provide the indication of incorrect placement of the document. Furthermore, the start button or output detector is adopted to complete the simplex scanning, so that the user can select the desired operation smoothly.

While this disclosure has been described by way of examples and in terms of preferred embodiments, it is to be understood that this disclosure is not limited thereto. To the contrary, it is intended to cover various modifications. Therefore, the scope of the appended claims should be accorded the broadest interpretation so as to encompass all such modifications.

What is claimed is:

1. A duplex scan indicative scanner, comprising:
   a sheet passage;
   a transporting mechanism transporting a document past the sheet passage;
   one single scanning module scanning a first side of the document passing through the sheet passage;
   a duplex indicator; and
   a connection interface electrically connected to an electronic device, the duplex indicator, the transporting mechanism and the scanning module, wherein after the electronic device controls, through the connection interface, the scanning module to scan the first side of the document, the electronic device controls, through the connection interface, the duplex indicator to output a duplex indication message to a user to guide the user to place the document or a second document, so that a second side of the document or the second document is scanned by the scanning module.

2. The duplex scan indicative scanner according to claim 1, further comprising an input detector disposed at an input end of the sheet passage and electrically connected to the connection interface, wherein the input detector detects the document and outputs an automatic scan signal to the electronic device through the connection interface, so that the electronic device starts the transporting mechanism and the scanning module through the connection interface according to the automatic scan signal.

3. The duplex scan indicative scanner according to claim 1, further comprising a start button, which is electrically connected to the connection interface and outputs a start signal upon being pressed by the user, wherein after the electronic device controls, through the connection interface, the duplex indicator to output the duplex indication message to the user, the electronic device receives the start signal through the connection interface and outputs image data representative of the first side.

4. The duplex scan indicative scanner according to claim 1, further comprising a blank-page indicator electrically connected to the connection interface, wherein the electronic device judges whether image data representative of the first side or the second side of the second document is blank image data or not, and controls, through the connection interface, the blank-page indicator to output a blank-page indication message to the user to guide the user to place the document or the second document if the image data is the blank image data.

5. The duplex scan indicative scanner according to claim 1, wherein after the electronic device controls, through the connection interface, the transporting mechanism and the scanning module to scan the first side of the document, the electronic device controls the duplex indicator to output the duplex indication message after a predetermined time has been delayed.

6. The duplex scan indicative scanner according to claim 1, further comprising an output detector electrically connected to the connection interface, and disposed at an output end of the sheet passage, wherein after the electronic device controls, through the connection interface, the transporting mechanism and the scanning module to scan the first side of the document, the transporting mechanism still nips the document, and the duplex indicator is controlled to output the duplex indication message after a predetermined time has been delayed, wherein the output detector detects a take-out signal, generated after the document has left the transporting mechanism, and the electronic device outputs image data representative of the first side through the connection interface according to the take-out signal.

7. The duplex scan indicative scanner according to claim 1, further comprising a mode selecting module, which is electrically connected to the connection interface and outputs a mode signal upon being pressed by the user, wherein the electronic device controls the scanning module to perform simplex scanning once and then to perform outputting according to the mode signal representative of simplex scanning, or controls the scanning module to perform simplex scanning twice and then to perform outputting according to the mode signal representative of duplex scanning.

8. A duplex scan indicative scanning apparatus, comprising:
   a scanner, comprising:
      a sheet passage;
      a transporting mechanism transporting a document past the sheet passage;
      one single scanning module scanning a first side of the document passing through the sheet passage; and
      a connection interface electrically connected to the scanning module and the transporting mechanism; and
   an electronic device being electrically connected to the scanner and comprising:
      a control processor electrically connected to the connection interface; and
      a duplex indicator electrically connected to the control processor, wherein after the control processor has controlled the scanning module to scan the first side of the document through the connection interface, the control processor controls the duplex indicator to output a duplex indication message to a user to guide the user to place the document or a second document, so that a second side of the document or the second document is scanned by the scanning module.

9. The duplex scan indicative scanning apparatus according to claim 8, wherein the duplex indicator is a non-display type indicator.

10. The duplex scan indicative scanning apparatus according to claim 8, wherein the electronic device further comprises a blank-page indicator electrically connected to the control processor, wherein the control processor judges whether image data representative of the first side or the second side of the second document is blank image data, and controls the blank-page indicator to output a blank-page indication message to the user to guide the user to place the document or the second document if the image data representative of the first side or the second side of the second document is the blank image data.

11. The duplex scan indicative scanning apparatus according to claim 8, wherein the electronic device further comprises a start button electrically connected to the control processor and to be pressed by the user to output a start signal, wherein after the control processor has controlled the duplex indicator to output the duplex indication message to the user, the control processor outputs image data representative of the first side according to the start signal.

12. The duplex scan indicative scanning apparatus according to claim 8, wherein the electronic device further comprises a mode selecting module electrically connected to the control processor and to be pressed by the user to output a mode signal, wherein the control processor controls the scanning module to perform simplex scanning and then to perform outputting according to the mode signal representative of simplex scanning, or controls the scanning module to perform simplex scanning twice and then to perform outputting according to the mode signal representative of duplex scanning.

13. A scanning method used in a combination of a duplex scan indicative scanner and an electronic device connected together, the scanning method comprising steps of:
   automatically scanning a first side of a document upon detecting the document located at an input end of a sheet passage;
   providing a duplex indication message to a user after automatically scanning the first side;
   automatically scanning a second side of the document or a second document upon detecting the document or the second document located at the input end after providing the duplex indication message; and
   outputting image data representative of the first side and the second side or the second document.

14. The scanning method according to claim 13, wherein the image data representative of the first side and the second side or the second document are printed out after a start signal has been received.

15. The scanning method according to claim 13, further comprising steps of:
   judging whether the first side is representative of a blank page according to the image data representative of the first side;
   outputting a blank page prompt message to the user if the first side is representative of the blank page; and
   providing the duplex indication message to the user if the first side is not representative of the blank page.

16. The scanning method according to claim 15, further comprising steps of:
   controlling a transporting mechanism to continue nipping the document after automatically scanning the first side;
   judging whether the document has been taken out of the transporting mechanism within a predetermined time;
   outputting the image data representative of the first side if the document has not been taken out of the transporting mechanism within the predetermined time; and
   providing the duplex indication message to the user if the document has been taken out of the transporting mechanism within the predetermined time.

* * * * *